US 8,516,208 B2

(12) United States Patent
Kawano et al.

(10) Patent No.: US 8,516,208 B2
(45) Date of Patent: Aug. 20, 2013

(54) DATA BACKUP METHOD AND INFORMATION PROCESSING APPARATUS

(75) Inventors: Yoko Kawano, Kawasaki (JP); Yuji Hanaoka, Kawasaki (JP); Terumasa Haneda, Kawasaki (JP); Atsushi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 533 days.

(21) Appl. No.: 12/721,808

(22) Filed: Mar. 11, 2010

(65) Prior Publication Data

US 2010/0241806 A1 Sep. 23, 2010

(30) Foreign Application Priority Data

Mar. 19, 2009 (JP) .................................. 2009-068996

(51) Int. Cl.
*G06F 12/00* (2006.01)
(52) U.S. Cl.
USPC .................... 711/162; 711/165; 711/E12.008
(58) Field of Classification Search
USPC .................................. 711/162, 165, E12.008
See application file for complete search history.

(56) References Cited

U.S. PATENT DOCUMENTS

| 2002/0026566 A1 | 2/2002 | Awada et al. |
| 2003/0023837 A1* | 1/2003 | Johnson ......................... 712/228 |
| 2008/0189484 A1 | 8/2008 | Iida et al. |
| 2008/0307015 A1* | 12/2008 | Keohane et al. .............. 707/204 |
| 2009/0063797 A1* | 3/2009 | Taguchi et al. ............... 711/162 |
| 2009/0276591 A1* | 11/2009 | Mu et al. ........................ 711/162 |
| 2011/0161297 A1* | 6/2011 | Parab ............................ 707/646 |

FOREIGN PATENT DOCUMENTS

| JP | 7-200415 | 8/1995 |
| JP | 11-353241 | 12/1999 |
| JP | 2004-13719 | 1/2004 |
| JP | 2008-192028 | 8/2008 |

* cited by examiner

*Primary Examiner* — Pierre-Michel Bataille
(74) *Attorney, Agent, or Firm* — Staas & Halsey LLP

(57) ABSTRACT

An information processing apparatus includes, a first storage unit, a second storage unit in which data stored in the first storage unit is backed up, and a memory controller that controls data backup operation. The memory controller divides a transfer source storage area into portions, and provides two transfer destination areas, each of the two transfer destination areas being divided into portions, backs up data in a direction from a beginning address of each divided area of the transfer source storage area to an end address thereof in one of the transfer destination areas provided for each divided area of the transfer source storage area, and backs up data in a direction from the end address of each divided area of the transfer source storage area to the beginning address thereof in the other transfer destination storage area.

7 Claims, 9 Drawing Sheets

DATA BACKUP METHOD AND INFORMATION PROCESSING APPARATUS

CROSS-REFERENCE TO RELATED APPLICATIONS

This application is based upon and claims the benefit of priority of the prior Japanese Patent Application No. 2009-068996, filed on Mar. 19, 2009, the entire contents of which are incorporated herein by reference.

FIELD

The embodiments described herein relate to a data backup method and an information processing apparatus and, more particularly, relate to a data backup method for performing backup of data stored in a storage unit and to an information processing apparatus.2.

BACKGROUND

FIG. 1 shows an example of an information processing apparatus. An information processing apparatus 1 includes a central processing unit (CPU) 11, a memory controller 12, a cache memory 13, a flash memory controller 14, a flash memory 15, a power supply unit 21, and a backup power supply unit 22, which are connected as shown in FIG. 1. As indicated by a solid line arrow, the power supply unit 21 to which AC power is provided supplies a DC power source voltage to power feeding targets 11, 12, 13, 14 and 15 shown enclosed by a short dashed line in FIG. 1. The backup power supply unit 22 is formed by, for example, a capacitor called a supercapacitor. The backup power supply unit 22 is charged by the DC power source voltage supplied from the power supply unit 21 while the power supply unit 21 is normally operating. During a power failure of the AC power source, or the like, the power supply unit 21 does not supply a DC power source voltage since an AC power source voltage is not supplied to the power supply unit 21. When the power supply unit 21 does not supply a DC power source voltage, the backup power supply unit 22 detects power failure and supplies a DC power source voltage to the power feeding targets 11, 12, 13, 14 and 15, as indicated by a dashed line arrow.

In this example, in order to enable data backup with two systems, two flash memories 15 are provided. For this reason, the flash memory controller 14 includes two direct memory access (DMA) engines (or DMA controllers (DMACs)) 141, and a defective block management table 142. The defective block management table 142 has stored therein information regarding defective blocks of the flash memory 15, and is referred to when the DMA engine 141 performs data backup. The DMA engine 141 recognizes a defective block (or a defective area) in the flash memory 15 by referring to the defective block management table 142 so as to identify an accessible block (or accessible area) of the flash memory 15, and performs backup of data for the accessible block.

During a power failure, since the supply of the DC power source voltage is performed from the backup power supply unit 22, there is a time limit on a backup process for data stored in the cache memory 13 that is a volatile memory. Therefore, in order to write the data of the cache memory 13 in the flash memory 15, data is written in parallel in two flash memories 15 that are non-volatile memories by using DMA engines 141 of two systems. However, when a difference occurs in the data backup time of the two systems due to an occurrence of an error, the data backup process is not completed unless the data backup by the slower system is completed. Furthermore, in a case where the data backup by the slower system cannot satisfy a time limit of the backup process, the data backup process fails.

Examples of an occurrence of an error include a case in which a block of the flash memory 15 to which data is transferred is recognized as a defective block by the defective block management table 142 when performing data backup, a case in which an error is detected when data is written to the flash memory 15, and other cases. When such an error occurs, a replacement process for searching for a block (or area) in a data-transferable, accessible in other words, flash memory 15 by referring to the defective block management table 142 becomes necessary.

FIG. 2 shows a data backup method of a related art. Before DMA transfer is started, the firmware of the information processing apparatus 1 causes the CPU 11 to specify, for each DMA engine 141, the beginning address of the cache memory 13 and the total data size to be transferred from the cache memory 13 to the flash memory 15. For example, the total data size is 2 Gbits, and the DMA transfer can be performed in units of 2 Mbytes. Control information necessary for a backup process is attached in units of each transfer and therefore, the transfer unit of the data to be actually transferred is 2×718 Mbytes.

In FIG. 2 and in FIG. 3 (to be described later), two flash memories 15 are denoted by Flash#0 and Flash#1 in such a manner as to correspond to the DMA engines 141 of two systems DMA0 and DMA1. In each of the systems DMA0 and DMA1, 1 Gbits of data, which is half of the total data size, is backed up.

In a case where backed-up data is to be read from the flash memory 15, the beginning address of the cache memory 13 and the total data size to be transferred from the flash memory 15 to the cache memory 13 are specified from the firmware to each of the DMA engines 141.

FIG. 3 shows a data backup method of the related art in a case where an error occurs. For the DMA engines 141, since the same data size is specified, the data backup by the system in which more errors occur during DMA transfer takes a longer time than data backup by the other system. For this reason, variations occur in the completion time of the data backup. For example, in a case where many errors occur in the system DMA0 and data backup takes a longer time, and errors scarcely occur in the system DMA1 and data backup is completed earlier, the data backup process for the information processing apparatus 1 is completed when the data backup by the system DMA0 is completed. In FIG. 3, as an example, in the data backup by the system DMA0, an error occurs between the backup of data D1-1 and the backup of data D1-2. On the other hand, in the data backup by the system DMA1, data D2-1 to D2-4 has been backed up without causing an error.

As described above, in the data backup method of the related art, problems exist including due to a case when data backup time periods of plural systems differ, the data backup process is not completed unless the data backup by the slowest system is completed.

SUMMARY

According to an aspect of the invention, an information processing apparatus includes, a first storage unit, a second storage unit in which data stored in the first storage unit is backed up, and a memory controller that controls data backup from the first storage unit to the second storage. The memory controller divides a transfer source storage area in the first storage unit into portions, and provides two transfer destination areas, each of the two transfer destination areas being divided into portions, backs up data in a direction from a beginning address of each divided area of the transfer source storage area to an end address thereof in one of the transfer destination areas provided for each divided area of the transfer source storage area, and backs up data in a direction from the end address of each divided area of the transfer source storage area to the beginning address thereof in the other transfer destination storage area, and completes the backup when the data of all the addresses of the divided areas is backed up.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
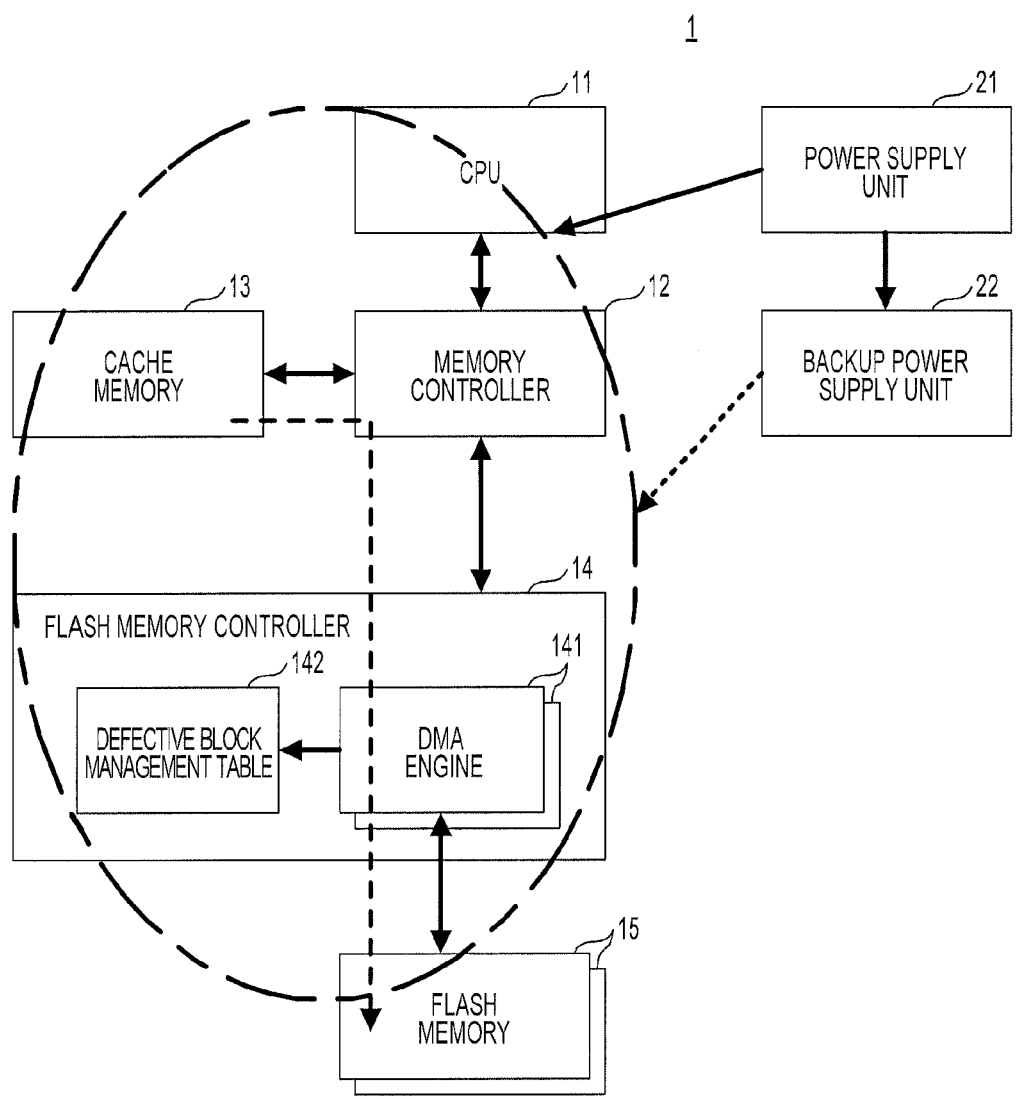
FIG. 1 shows an example of an information processing apparatus.
Figure 2:
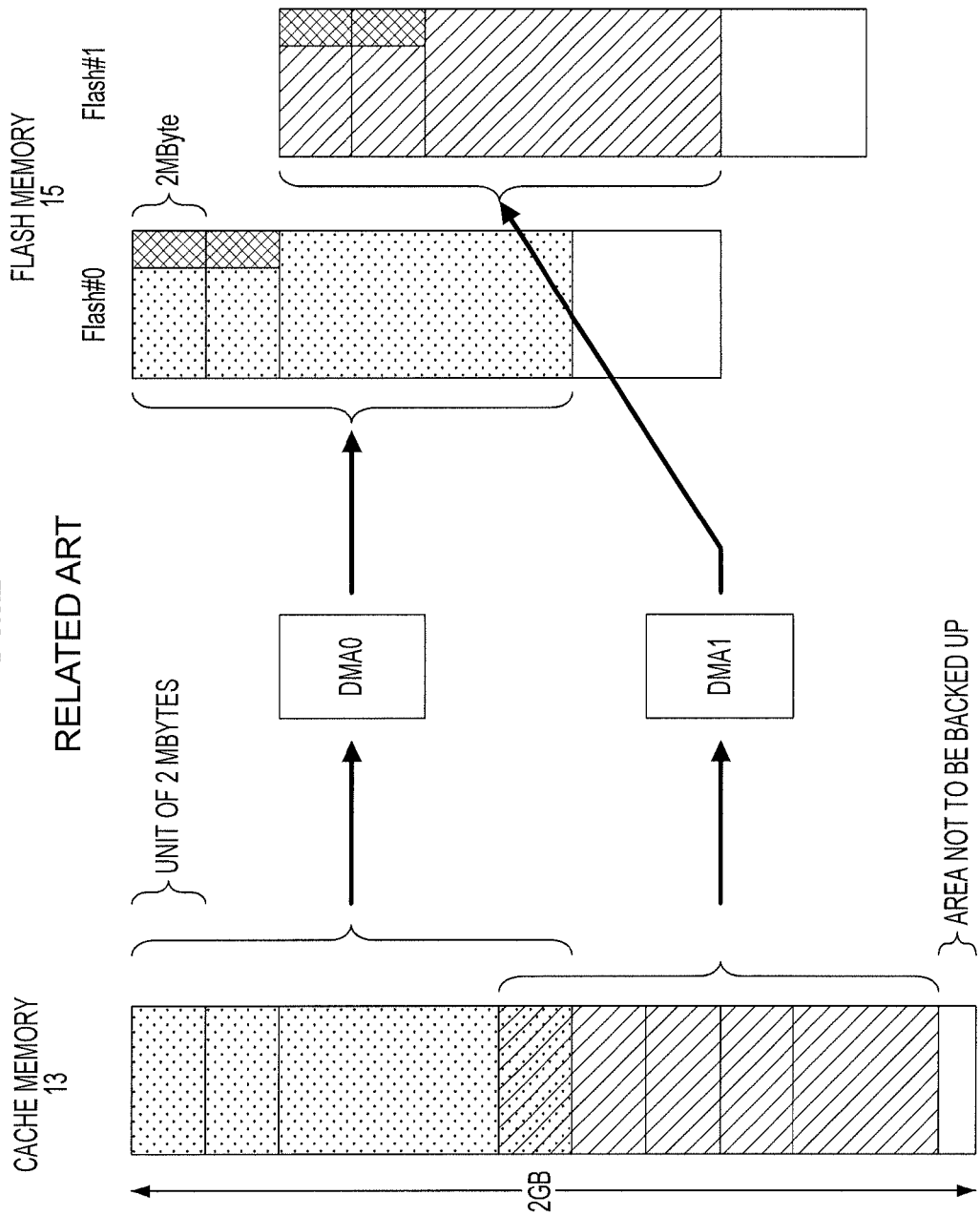
FIG. 2 shows a data backup method of the related art.
Figure 3:
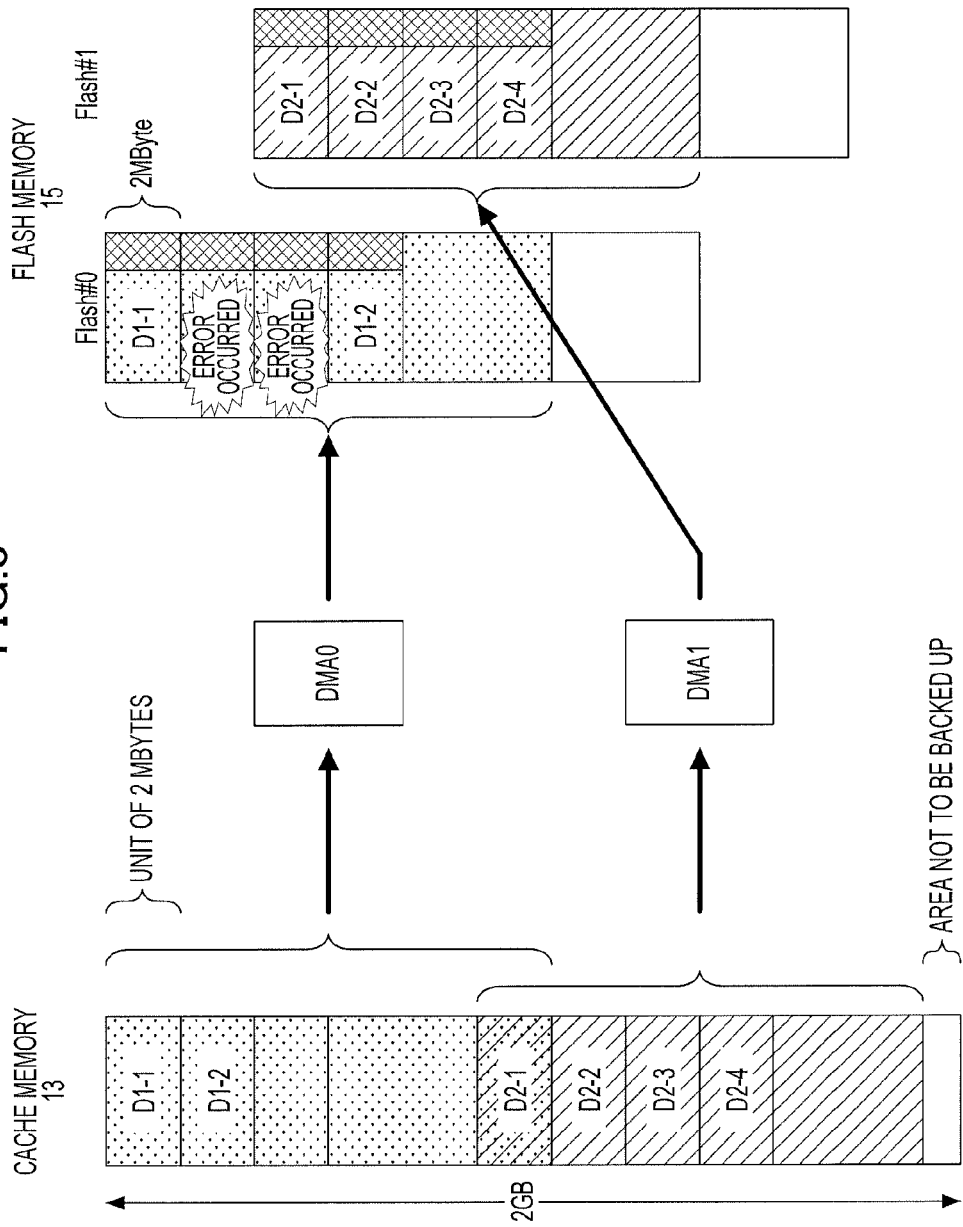
FIG. 3 shows a data backup method of the related art in a case where an error occurs.

Reference will now be made in detail to the embodiments, examples of which are illustrated in the accompanying drawings, wherein like reference numerals refer to the like elements throughout. The embodiments are described below to explain the present invention by referring to the figures.

In an embodiment of a data backup method and an information processing apparatus, a storage area in a first storage unit having a size corresponds to a size of data to be transferred from the first storage unit to a second storage unit is divided into N (N is a natural number) portions, and two second storage units are provided for each of the N divided areas of the same size. In one of the two second storage units provided for the divided areas, data is backed up in sequence in a direction from a beginning address of the divided areas to an end address thereof. Also, in the other second storage unit, data is backed up in sequence in a direction from the end address of the divided areas to the beginning address thereof. The backup of the data for the divided areas is completed when the data stored at all the address positions of the divided areas is backed up in the two second storage units. Furthermore, when the backup of the data for the N divided areas is completed, the data backup process is completed.

As a result, even if the data backup times of plural systems differ, it is possible to complete the data backup process in a short time period.

Figure 4:
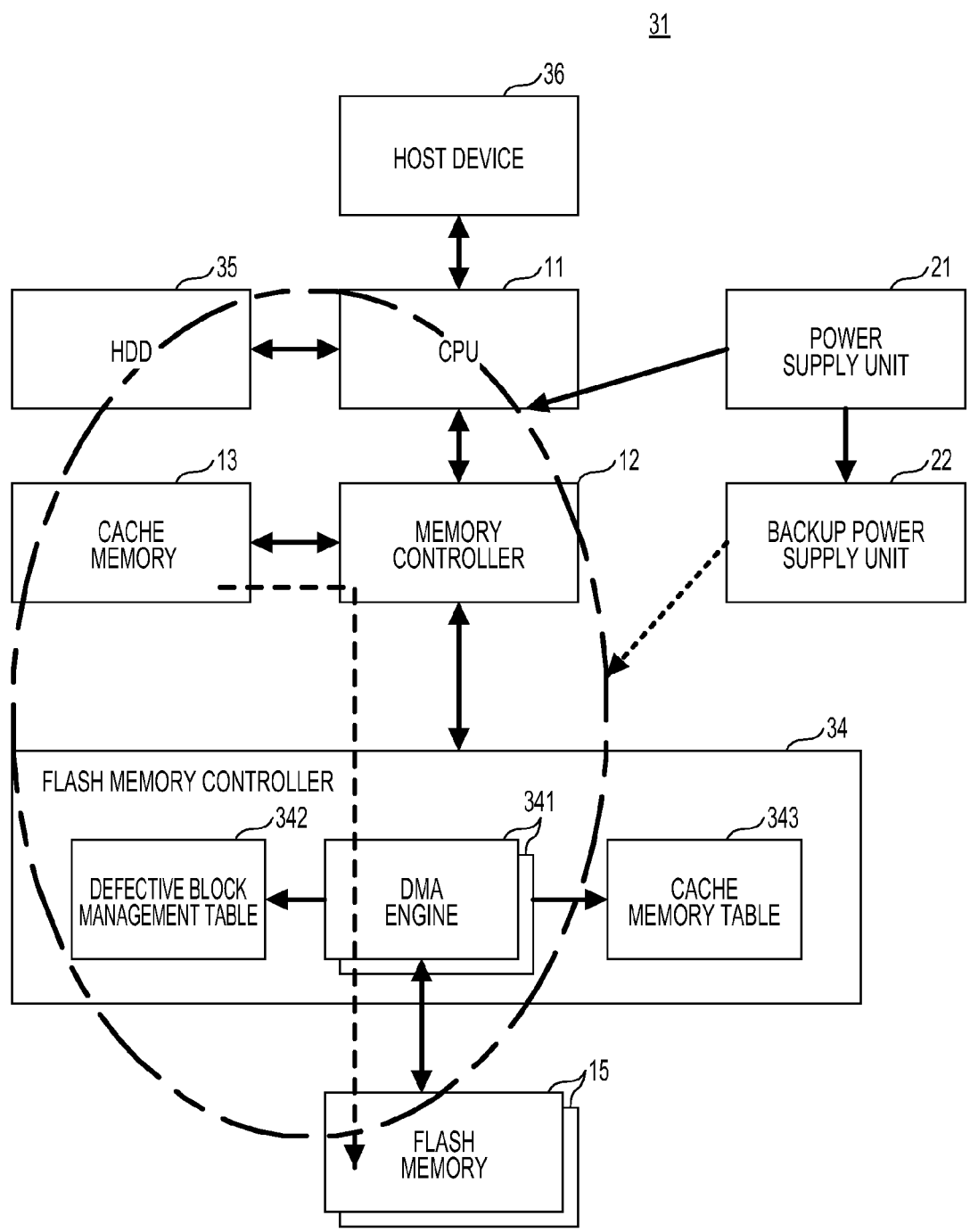
FIG. 4 shows an example of an information processing apparatus according to an embodiment of the present invention.

FIG. 4 shows an example of an information processing apparatus according to an embodiment of the present invention. Components of the information processing apparatus shown in FIG. 4, which are identical to the components of the information processing apparatus shown in FIG. 1, are designated with the same reference numerals, and the descriptions thereof are omitted.

An information processing apparatus 31 includes a CPU 11, a hard disk drive (HDD) 35, a memory controller 12, a cache memory 13, a flash memory controller 34, a flash memory 15, a power supply unit 21, and a backup power supply unit 22, which are connected as shown in FIG. 4. The power supply unit 21, as indicated by a solid line arrow, supplies a DC power source voltage to power feeding targets 11, 12, 13, 15, 34, and 35 enclosed by a short dashed line in FIG. 4. During a power failure of an AC power source, the power supply unit 21 does not supply a DC power source voltage and therefore, the backup power supply unit 22 supplies a DC power source voltage to the power feeding targets 11, 12, 13, 15, 34, and 35, as indicated by a dashed line arrow.

The HDD 35 may be provided with a plurality of disk devices. Furthermore, the information processing apparatus 31 can be made to function as a storage device, such as a redundant arrays of independent disks (RAID) device. A host device 36 issues a read request and a write request from the outside of the information processing apparatus 31 in a case where the information processing apparatus 31 is used as, for example, a storage device. The HDD 35 of the information processing apparatus 31 can be omitted, and it is not imperative that the information processing apparatus 31 is connected to the host device 36.

The memory controller 12 and the flash memory controller 34 need not to be physically separated and may be formed by a single controller.

In this example, since data backup by two systems is possible, two flash memories 15 are provided. For this reason, the flash memory controller 34 includes two DMA engines (or DMAC) 341, a defective block management table 342 and a cache memory table 343, which are accessible by the DMA engine 341. The defective block management table 342 stores therein information regarding defective blocks of the flash memories 15, and is referred to when the DMA engine 341 performs data backup. The DMA engine 341 recognizes a defective block in the flash memory 15 by referring to the defective block management table 342, and identifies an accessible block (or accessible area) of the flash memory 15. In an embodiment, the cache memory table 343 stores therein a flag FLG indicating whether or not the data of each address has been backed up, and information MK indicating which one of the DMA engines 341 of two systems has performed the backup of the data. The flash memory controller 34 can be formed by, for example, a field programmable gate array (FPGA).

The defective block management table 342 and the cache memory table 343 can be formed by a non-volatile storage unit, such as a memory, which is provided in the flash memory controller 24. Neither of them needs to be provided in the flash memory controller 24, and may be formed by a storage unit that is externally provided for the flash memory controller 24. That is, the defective block management table 342 and the cache memory table 343 can also be formed by the flash memory 15.

During a power failure, or the like, since the supply of the DC power source voltage is performed from the backup power supply unit 22, a backup process for data stored in the cache memory 13 that is a volatile memory has a time-related limitation. Therefore, in an embodiment, in order to write the data of the cache memory 13 to the flash memory 15, data is written in parallel into two flash memories 15 by using the DMA engines 341 of two systems.

Figure 5:
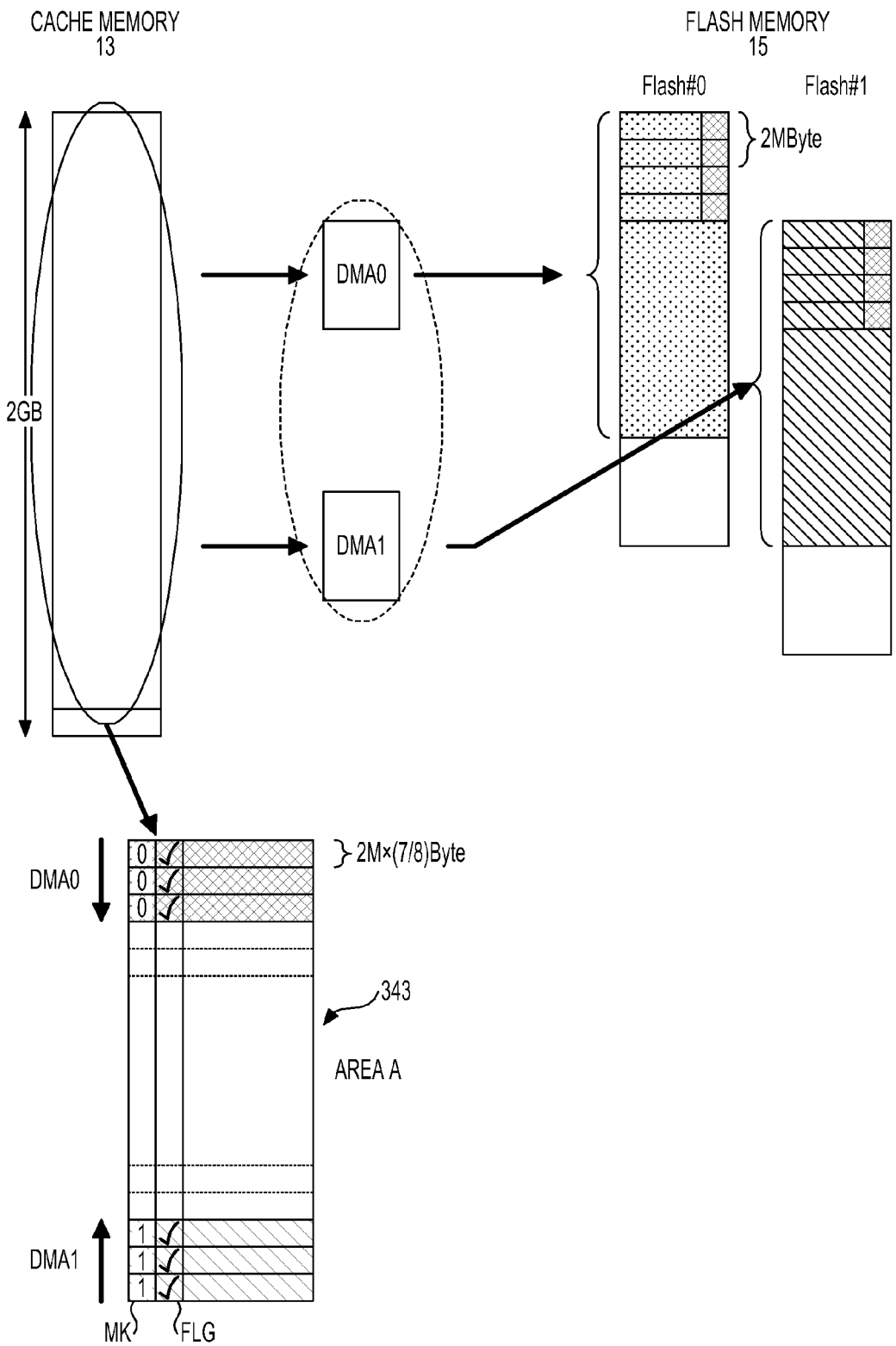
FIG. 5 shows a data backup method according to an embodiment.

FIG. 5 illustrates a data backup method according to an embodiment. The firmware of the information processing apparatus 31 is stored in, for example, the HDD 35 and, before DMA transfer is started, the firmware specifies, for the DMA engine 341, a total data size to be transferred from the cache memory 13 to the flash memory 15 by the CPU 11, and the beginning address and the end address of the cache memory 13, which correspond to the total size. As a result, the DMA engine 341 stores the beginning address and the end address of the cache memory 13 at positions that correspond to the total data size of the cache memory table 343. For example, the total data size is 2 Gbits, and the DMA transfer is performed in units of 2 Mbytes. Control information necessary for a backup process is attached in units of each transfer and therefore, the transfer unit of data that is actually transferred is 2×718 Mbytes.

In FIG. 5 and in FIGS. 6 to 8 (to be described later), two flash memories 15 are denoted by Flash#0 and Flash#1 in such a manner as to correspond to the DMA engines 341 of systems DMA0 and DMA1. The combination of systems DMA0 and DMA1 allows data having a total data size of 2 Gbits to be backed up.

As shown in FIG. 5, a storage area in the cache memory 13 corresponding to the total data size to be transferred from the cache memory 13 to the flash memory 15 is assumed to be one divided area, that is, an area A, and two flash memories 15 (Flash#0, Flash#1) are provided for this area A. In one of the two flash memories 15 (for example, Flash#0) provided for the area A, data is backed up in sequence in the direction from the beginning address of the area A to the end address thereof. In the other flash memory 15 (for example, Flash#1), data is backed up in sequence in the direction from the end address of the area A to the beginning address thereof. With respect to the area A, the DMA engines 341 of two systems (DMA0, DMA1) separately control the backup of data by DMA transfer in one of the flash memories 15 (Flash#0) and the other (Flash#1).

When, with respect to the area A, the data of each address is backed up in the flash memory 15, a flag FLG indicating that the data of the address has already been backed up is set in the cache memory table 343. When the flag FLG has been set for the next address when data is to be backed up in sequence in each direction, the backup of the data in the target direction is completed. Furthermore, information MK indicating which one of the DMA engines 341 of two systems (DMA0, DMA1) has performed the backup of the data for the area A is stored together with the flag FLG in the cache memory table 343. In FIG. 5, the set flags FLG are indicated by an indicator, such as symbols ✓. When the information MK is 0, this indicates that the system DMA0 has performed the backup of the data, and when the information MK is 1, this indicates that the system DMA1 has performed the backup of the data. Furthermore, in FIG. 5, a field following the information MK and the flag FLG of the cache memory table 343 indicates the address of the cache memory 13.

The backup of the data with respect to the area A is completed when the data of all the addresses in this area A is backed up in the two flash memories 15, and the backup process of the data of the total data size is completed.

In a case where the backed-up data is to be read from the flash memory 15, the total data size to be transferred from the flash memory 15 to the cache memory 13 and the address of the data to be transferred should be determined by using the cache memory table 343. Therefore, it is possible to omit a process for specifying by the firmware, for each DMA engine 341, the beginning of the address of the cache memory 13 and the total data size to be transferred from the flash memory 15 to the cache memory 13, which are necessary to read backed-up data from the flash memory 15 in the related art of FIG. 1.

Figure 6:
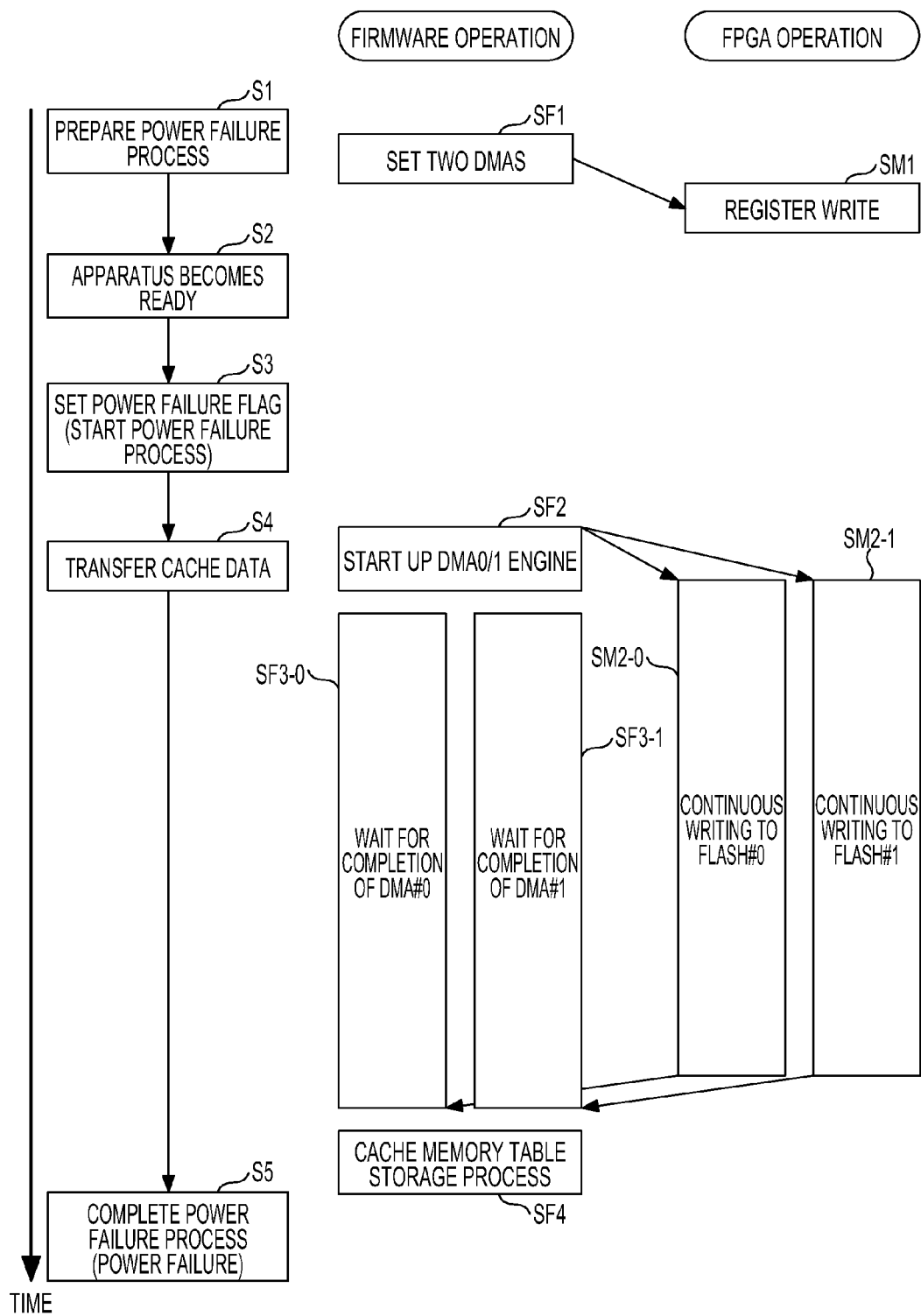
FIG. 6 shows a data backup process of FIG. 5.

FIG. 6 shows the data backup process of FIG. 5 together with firmware operations and the operation (FPGA operation) of the flash memory controller 34. As shown in FIG. 6, in S1, a preparation for a power failure process is performed. As a result, in SF1, the firmware specifies, for the DMA engine 341, the total data size transferred from the cache memory 13 to the flash memory 15, and the beginning address and the end address of the cache memory 13, which correspond to the total data size. In SM1, the DMA engine 341 performs a register write process for storing the beginning address and the end address of the cache memory 13 and the total data size to be transferred in an internal register (not shown). The beginning address and the end address of the cache memory 13 are stored at the positions that correspond to the total data size of the cache memory table 343.

In S2, the information processing apparatus 31 enters a ready state. During the ready state, for example, if a power failure occurs, the backup power supply unit 22 becomes able to detect the power failure. When the power failure is detected, in S3, the backup power supply unit 22 sets a power failure flag at an appropriate place in the information processing apparatus 31. As a result, a power failure process, that is, a data backup process, is started.

In S4, cache data transfer for transferring the data in the cache memory 13 to the flash memory 15, that is, a backup process, is performed. In SF2, the firmware starts up the DMA engine 341 (DMA0, DMA1). In response to the start up from the firmware, in SM2-0 and SM2-1, a data backup process for continuously writing the data in the cache memory 13, which should be backed up by the DMA engines 341 (DMA0, DMA1), in the flash memories 15 (Flash#0, Flash#1) in parallel is performed. In this case, the DMA engine 341 has recognized that a defective block does not exist in the destination to which data to be backed up is transferred by referring to the defective block management table 242. Furthermore, since an error is not detected during continuous writing to the flash memory 15 (Flash#0, Flash#1), data backup is performed while sequentially updating the cache memory table 343.

In SF3-0 and SF3-1, the firmware waits for the completion of the data backup to the flash memory 15 (Flash#0, Flash#1) by the corresponding DMA engine 341 (DMA0, DMA1). When the notification of the completion of the data backup is received from both the DMA engines 341 (DMA0, DMA1), the process proceeds to SF4. In SF4, the firmware performs a storage process for storing the content of the updated cache memory table 343. This completes the power failure process in S5.

Figure 7:
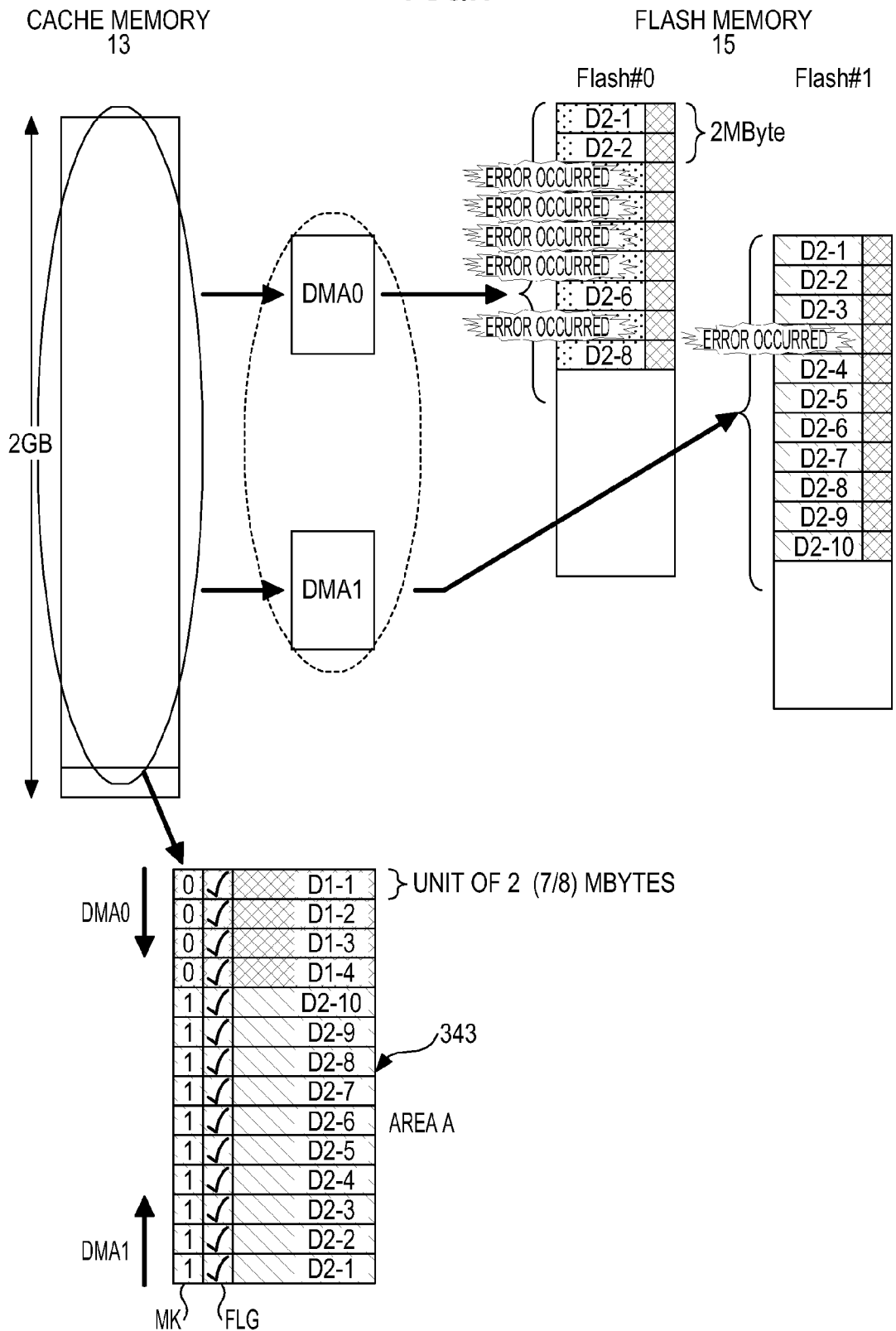
FIG. 7 shows a data backup method in an embodiment in a case where an error occurs.

FIG. 7 shows a data backup method in an embodiment in a case where an error occurs. Portions shown in FIG. 7, which are identical to the portions shown in FIG. 5, are designated with the same reference numerals, and the descriptions thereof are omitted.

Examples of an occurrence of an error include a case in which a block of the flash memory 15, which is the destination to which data is transferred when the DMA engine 341 (DMA0, DMA1) performs data backup, is recognized as a defective block from the defective block management table 142, a case in which an error is detected during continuous writing to the flash memory 15 (Flash#0, Flash#1), and other cases. When such an error occurs, a replacement process for searching for a block (or area) in the data-transferrable, that is, accessible, flash memory 15 by referring to the defective block management table 342 becomes necessary. Such a replacement process is well known.

One of the DMA engines 341 (DMA0) backs up data in sequence in the direction from the beginning address of the area A to the end address thereof in one of the flash memories 15 (Flash#0). Also, in parallel with this backup, the other DMA engine 341 (DMA1) backs up data in sequence in the direction from the end address of the area A to the beginning address thereof in the other flash memory 15 (Flash#1). FIG. 7 shows, as an example, a case in which in the data backup by the system DMA0, four errors have occurred between the backup of data D1-2 and the backup of data D1-3, and one error has occurred between the backup of data D1-3 and the backup of data D1-4; and in the data backup by the system DMA1, one error has occurred between the backup of data D2-3 and the backup of data D2-4.

When, with respect to the area A, the data of each address is backed up in the flash memory 15, the flag FLG indicating that the data of the address has been backed up is set in the cache memory table 343. When the flag FLG has been set for the next address in the case that data is to be backed up in sequence in each direction, the backup of the data in the direction is completed. Furthermore, information MK indicating which one of the DMA engines 341 (DMA0, DMA1) of two systems has performed the backup of the data for the area A is stored, together with the flag FLG, in the cache memory table 343.

The backup of the data for the area A is completed when the data of all the addresses in this area A is backed up in the two flash memories 15, and the backup process of the data of the total data size is completed. In the example of FIG. 7, the backup process for the area A is completed when the backup of the data D1-4 by the system DMA0 is completed and the backup of the data D2-10 by the system DMA1 is completed.

In the present embodiment, the data size of the backup performed by each of the systems DMA0 and DMA1 is not fixed to the same data size. Each of the backups is continued until the flag FLG is set for the next address by using the cache memory table 343. For this reason, even in a case where data backup by one of the two systems in which many more errors occur during DMA takes a longer time than the data backup by the other system, the data backup by the system in which the number of error occurrences is small is made to proceed correspondingly, making it possible to shorten the time required for the data backup process for the entire information processing apparatus 31. In the example of FIG. 7, many errors occur in the system DMA0, and the data backup takes a longer time, whereas in the system DMA1, errors scarcely occur, and the data backup can be made to proceed. Therefore, it is possible to complete the data backup process for the entire information processing apparatus 31 in a short time. In addition, since the data backup process can be completed in a short time, the size of the capacitor forming the backup power supply unit 22 can be decreased, and the cost can be reduced correspondingly.

Figure 8:
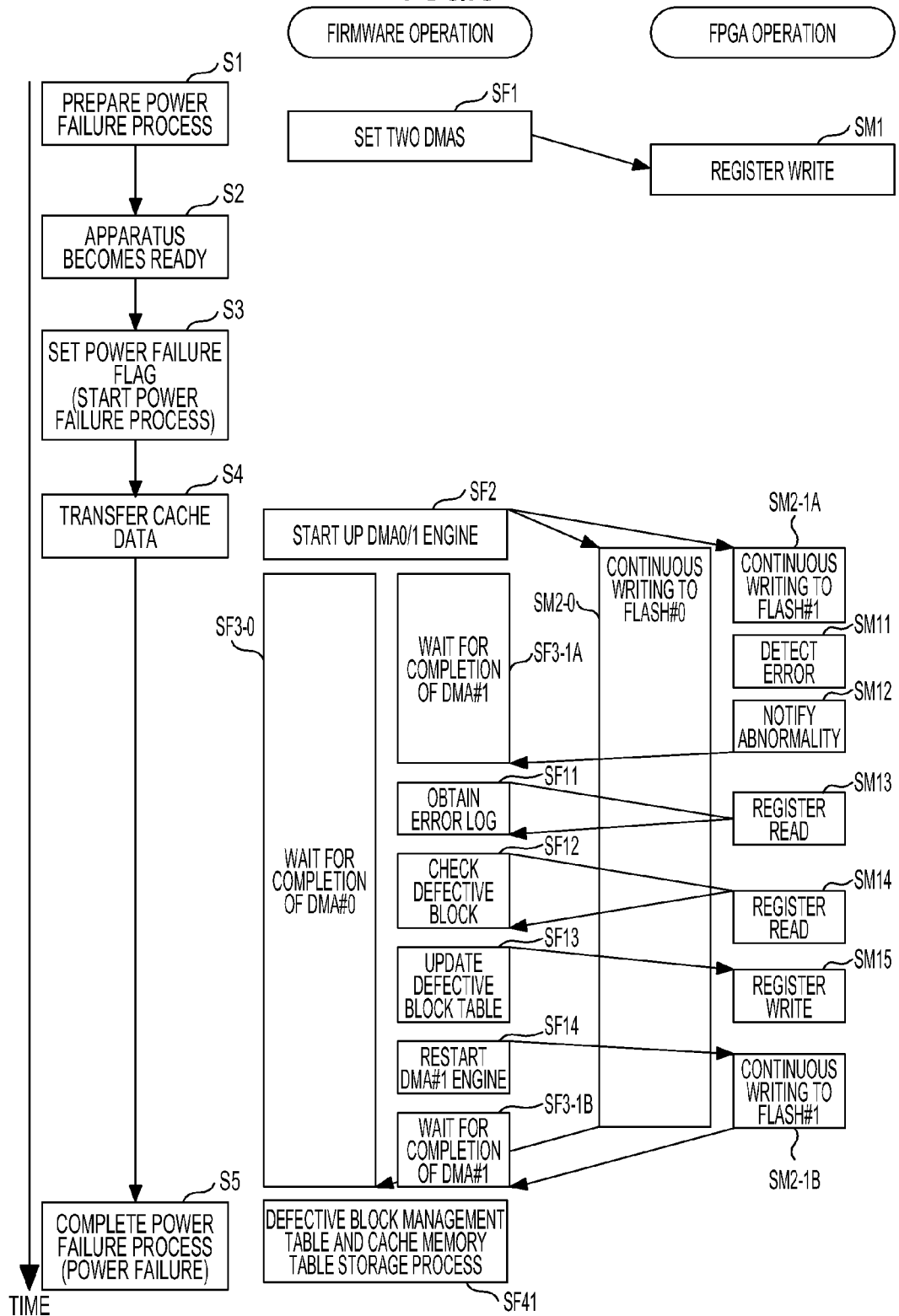
FIG. 8 shows a data backup process such as that shown in FIG. 7.

FIG. 8 shows the data backup process shown in FIG. 7 together with firmware operations and the operation (FPGA operation) of the flash memory controller 34. Portions shown in FIG. 8, which are identical to the portions shown in FIG. 6, are designated with the same reference numerals, and the descriptions thereof are omitted. However, in FIG. 8, for the convenience of description, it is assumed that no error has occurred in the system DMA0 and one error has occurred in the system DMA1. In a case where an error occurs in the system DMO, the same processing as for the system DMA0 should be performed. Furthermore, in a case where two or more errors occur, the same processing should be performed on each error.

In FIG. 8, in SF2, the firmware starts up the DMA engine 341 (DMA0, DMA1). A process for performing, in response to SF2, data backup for continuously writing data in the cache memory 13 in the flash memory 15 (Flash#0), which should be backed up by the DMA engine 341 (DMA0) in SM2-0, and a process for the firmware to wait for the completion of the data backup to the flash memory 15 (Flash#0) by the corresponding DMA engine 341 (DMA0) in SF3-0 are the same as in the case of FIG. 6.

Processing for the system DMA1 (Flash#1), in which an error has occurred, is performed in the following manner. In response to the start up from the firmware, in SM2-1A, a data backup process for continuously writing the data in the cache memory 13 into the flash memory 15 (Flash#1), which should be backed up by the DMA engine 341 (DMA1). In this case, it is assumed that the DMA engine 341 (DMA1) has detected an error during the continuous writing to the flash memory 15 (Flash#1) in SM11. When an error is detected as described above, in SM12, an error log containing addresses at which errors have occurred is stored in an internal register (not shown) in the DMA engine 341 (DMA1) and also, the firmware is notified of the errors.

In response to an error notification from the DMA engine 341 (DMA1), in SF11, the firmware requests the DMA engine 341 (DMA1) for an error log regarding a notified error. In SM13, the DMA engine 341 (DMA1) performs register reading for reading the error log requested from the firmware and sends back the error log to the firmware. The firmware obtains the read error log.

In SF12, the firmware requests the DMA engine 341 (DMA1) to check a defective block. In SM14, the DMA engine 341 (DMA1) reads register for referring to the defective block management table 342, checking a defective block, which is requested from the firmware, and sends back the defective block. Thus, the firmware performs checking of the defective block.

In SF13, the firmware requests the DMA engine 341 (DMA1) to update the defective block table 342 in which a defective block that has been newly detected from the error log obtained in SF11 is contained. In SM15, the DMA engine 341 (DMA1) performs register writing into the internal register so that the newly detected defective block is contained in the defective block table 342.

After SF13, in SF14, the firmware restarts the DMA engine 341 (DMA1). In response to the restart from the firmware, in SM2-1B, the DMA engine 341 (DMA1) performs a data backup process for performing data backup for continuously writing the data in the cache memory 13 into the flash memory 15 (Flash#1), which should be backed up. In this example, since an error is not detected during the continuous writing into the flash memory 15 (Flash#1) in SM2-1B, the data backup is performed while sequentially updating the cache memory table 343.

The DMA engine 341 (DMA1) performs SM11 to SM15 each time an error is detected during continuous writing into the flash memory 15 (Flash#1), and the firmware performs SF11 to SF14 and SF3-1B.

In SF3-0 and SF3-1B, the firmware waits for the completion of the data backup to the flash memory 15 (Flash#0, Flash#1) by the corresponding DMA engine 341 (DMA0, DMA1). When the completion notification of the data backup is received from both the DMA engines 341 (DMA0, DMA1), the process proceeds to SF41. In SF41, the firmware performs a storage process for storing the updated defective block management table 342 and the content of the updated cache memory table 343. This completes the power failure process in S5.

In a case where the DMA engine 341 (DMA0) recognizes that a defective block exists in the destination to which data to be backed up is transferred by referring to the defective block management table 242, the DMA engine 341 (DMA0) performs the above-described replacement process and performs data backup while sequentially updating the cache memory table 343. Therefore, when compared to the case in which a defective block does not exist in the transfer destination and a replacement process is not performed, the data backup takes a longer time. As described above, the firmware and the DMA engine 34 perform different processing operations between an error that occurs as a result of recognizing, from the defective block management table 242, that a defective block exists in the destination to which data to be backed up is transferred and an error that occurs as a result of detecting an error, for example, during continuous writing into the flash memory 15 (Flash#1) as in operation SM11 described above. In FIG. 7, these errors are shown in the figures as "error occurred" without distinguishing between the errors.

Figure 9:
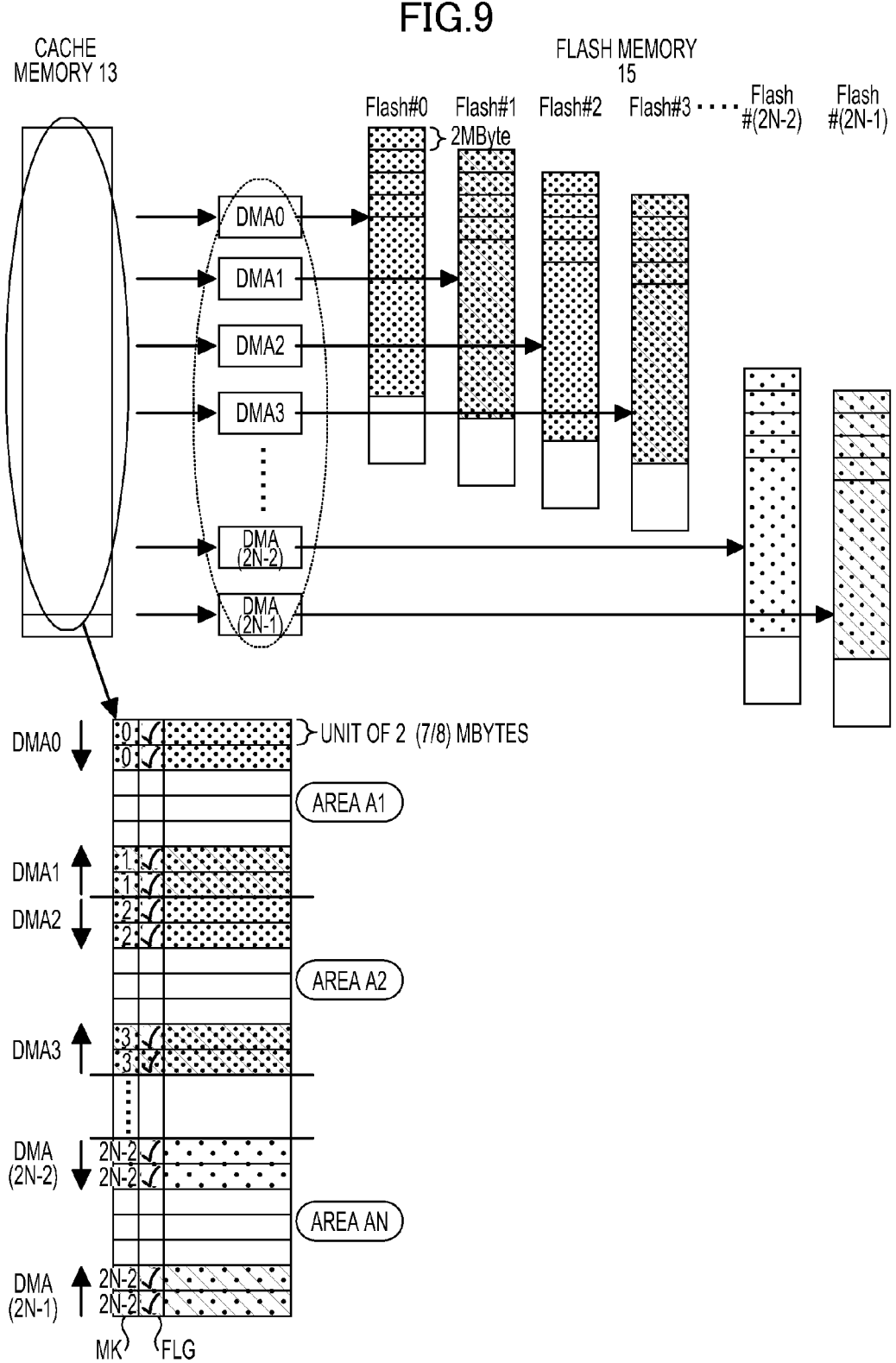
FIG. 9 shows a data backup method according to an embodiment of the present invention.

FIG. 9 shows a data backup process according to an embodiment of the present invention. Portions shown in FIG. 9 which are identical to the portions shown in FIG. 5 are designated with the same reference numerals, and the descriptions thereof are omitted.

In the above-described embodiment, a storage area in the cache memory 13, having a size corresponds to the total data size to be transferred from the cache memory 13 to the flash memory 15, is assumed as one divided area, that is, an area A. Two flash memories 15 (Flash#0, Flash#1) are provided for this area A.

In comparison, in the present embodiment, as shown in FIG. 9, a storage area in the cache memory 13, having a size corresponds to the total data size to be transferred from the cache memory 13 to the flash memory 15, is assumed as N divided areas, that is, areas A1 to AN, and two flash memories 15 are provided for each of the areas A1 to AN. In FIG. 9, two flash memories 15 (Flash#0, Flash#1) are provided for the area A1, two flash memories 15 (Flash#2, Flash#3) are provided for the area A2, ..., two flash memories 15 (Flash#2N-2, Flash#2N-1) are provided for the area AN. That is, the DMA engines 341 (DMA0 to DMA2N-1) of 2N systems are provided in the flash memory controller 34. Data backup performed for each of the areas A1 to AN is the same as the data backup performed for the area A in the above-described embodiment and accordingly, the description thereof is omitted.

According to the present embodiment, even in a case where the total data size to be transferred from the cache memory 13 to the flash memory 15 is large, by effectively distributing errors that occur among data backups for the areas A1 to AN, it is possible to complete the data backup process for the entire information processing apparatus in a short time.

It can be seen from the above-described embodiments that the data backup method may be performed in the following manner.

A storage area in the cache memory 13, which corresponds to the total data size to be transferred from the cache memory 13 to the flash memory 15, is divided into N (N is a natural number) portions, and 2N flash memories 15 (Flash#0 to Flash#2N-1) are provided for N divided areas (or areas) A1 to AN, According to an embodiment, in one of the two flash memories provided for each of the divided areas A1 to AN, data is backed up in sequence in the direction from the beginning address of the divided areas to the end address thereof and also, in the other flash memory, data is backed up in sequence in the direction from the end address of the divided areas to the beginning address thereof, and According to an embodiment, the backup of the data for each of the divided areas A1 to AN is completed when the data of all the addresses in the divided areas is backed up in the two flash memories 15, and the backup process of the data of the total data size is completed when the backup of the data for the N divided areas A1 to AN is completed.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiment(s) of the present invention(s) has(have) been described in detail, it should be understood that the various changes, substitutions, and alterations could be made hereto without departing from the spirit and scope of the invention, the scope of which is defined in the claims and their equivalents.

What is claimed is:

1. A data backup method for backing up data from a first storage unit to a second storage unit, the data backup method comprising:

dividing a transfer source storage area in the first storage unit in which data to be transferred from the first storage unit to the second storage unit is stored into portions, and providing two transfer destination areas of an equal size, each of the two transfer destination areas being divided into portions;

sequentially backing up data in a direction from a beginning address of the divided areas of the transfer source area to an end address thereof in one of the transfer destination areas provided for each divided area of the transfer source storage area, and backing up data in sequence in a direction from the end address of each divided area of the transfer source storage area to the beginning address thereof in the other transfer destination storage area; and completing the backup when the data of all the addresses of the divided areas of the transfer source area is backed up in the divided areas of the transfer destination storage area.

2. The backup method according to claim 1, comprising:

setting, when the data of each address of the divided areas of the transfer source storage area is backed up in the divided areas of the transfer destination storage area, a flag indicating that the data of the address has been backed up; and completing the backup of the data in the direction when the flag has been set for a next address in a case where the data is to be backed up in sequence from each direction.

3. The backup method according to claim 2, comprising:

controlling separate data backup processes for the transfer destination storage areas of the second storage unit by two transfer units for the divided areas of each transfer destination area; and storing the flag in a cache memory that is accessible by the transfer units.

4. The backup method according to claim 3, comprising:

storing together with the flag, in the cache memory, information indicating which one of the two transfer units has performed the backup of the data for each divided area of the transfer source storage area.

5. The backup method according to claim 4, comprising:

identifying, when data for each divided area of the transfer source storage area is to be backed up, an accessible area in the first storage unit by referring to a defective block management table in which information regarding defective blocks in the first storage unit is stored.

6. An information processing apparatus, comprising:

a first storage unit that functions as a main storage of a processor;

a second storage unit in which data stored in a backup target area of the first storage unit is backed up during power failure time; and a memory controller that controls backing up of data from the first storage unit to the second storage, and wherein the memory controller:

divides a transfer source storage area in the first storage unit in which data to be transferred from the first storage unit to the second storage unit is stored into portions, and provides two transfer destination areas of an equal size, each of the two transfer destination areas being divided into portions, sequentially backs up data in a direction from a beginning address of each divided area of the transfer source storage area to an end address thereof in one of the transfer destination areas provided for each divided area of the transfer source storage area, and sequentially backs up data in a direction from the end address of each divided area of the transfer source storage area to the beginning address thereof in the other transfer destination storage area, and completes the backup when the data of all the addresses of the divided areas of the transfer source area is backed up in the divided areas of the transfer destination storage area.

7. The information processing apparatus according to claim 6, comprising:

a power supply unit to which an AC power source voltage is supplied, the power supply unit supplying a DC power source voltage to the processor, the first and second storage units, and the memory controller; and a backup power supply unit that is charged by the DC power source voltage supplied by the power supply unit, the backup power supply unit supplying a DC power source voltage to the processor, the first and second storage units, and the memory controller in place of the power supply unit when the power supply unit does not supply a DC power source voltage, wherein the memory controller performs a data backup process when the power supply unit does not supply a DC power source voltage.

* * * * *